Jan. 26, 1965  W. A. BRAZELL  3,167,458
STORAGE BATTERY CASE
Filed Oct. 20, 1961  2 Sheets-Sheet 1
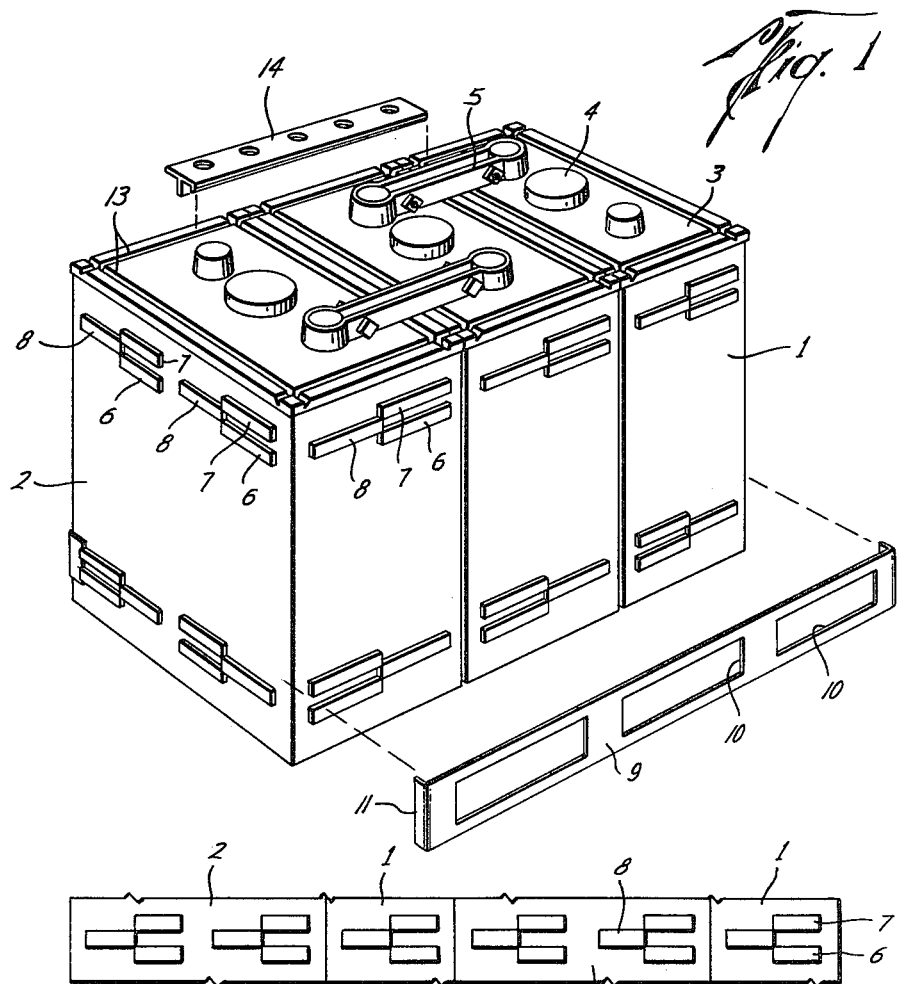
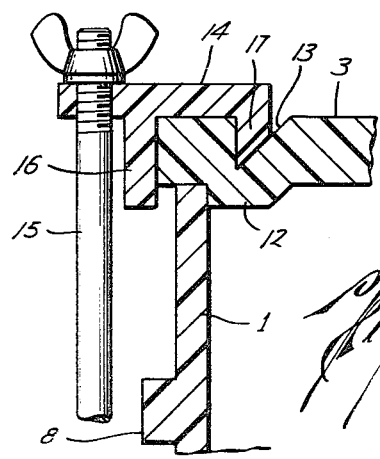
W. Allen Brazell
INVENTOR.
BY  *J C Helmig*
ATTORNEY

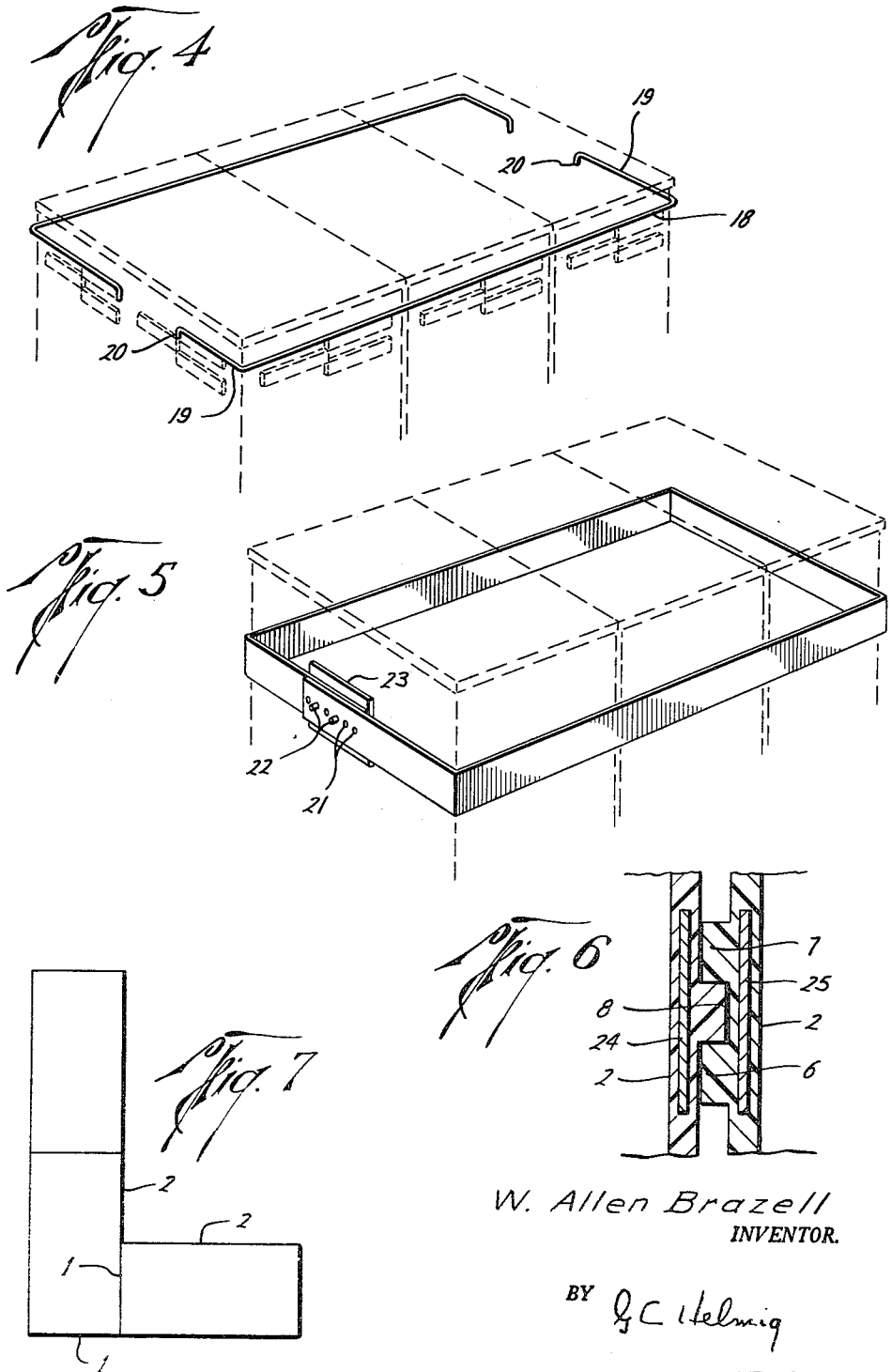

United States Patent Office 3,167,458
Patented Jan. 26, 1965

3,167,458
STORAGE BATTERY CASE
William Allen Brazell, 3839 Aberdeen Way,
Houston 25, Tex.
Filed Oct. 20, 1961, Ser. No. 146,472
11 Claims. (Cl. 136—166)

This invention relates to electric storage batteries made up of separately subassembled and individual cell units which can be grouped together in selected numbers and lines of succession, either side by side or end to end or in various combinations of side and end relations, and more particularly to an improved arrangement for maintaining aligned securement of cell cases in a multicell battery while accommodating selective and easy replacement of any cell case unit as well as ready rearrangement in the successive order of a bank of cell cases.

An object of the invention is to provide an improved and simplified arrangement of complemental locating formations on the vertical walls of a cell enclosing case or box for mating co-operation with complemental formations similarly located on the vertical walls of an adjacent companion cell box and which formations are brought together by relative box movement in a direction normal to the vertical walls and joining the walls against displacement in all directions extending along the surface plane of the box wall in a manner better to withstand stress.

Another object of the invention is to provide a molded rectangular cell case for grouped combination with other like cases and provided on each vertical wall with spaced apart spacer bosses arranged in identical pattern and vertical disposition on all four walls and shaped as laterally protruding keys and complemental key receiving sockets so that when a pair of cases are brought into alignment horizontally the keys of adjoining walls respectively align themselves with complemental sockets of the neighboring wall and a final coupling movement toward one another in a direction normal to the walls places the projecting keys into socket interfitment.

A further object of the invention is to provide adjoining walls of a battery cell group with complemental mating elements which hold the cells against vertical and horizontal displacement in a plane parallel to the walls, together with cell engaging binder means which holds the cells against spreading apart in the direction normal to the aforesaid plane.

A still further object of the invention is to provide an individual cell box unit having a specially formed cover involving a thickened marginal portion inwardly of each of the four edges to provide a vertical wall locating shoulder on its underside and a grooved upper side for the seating therein of a hold-down clamp flange and which upper side groove will be in aligned continuation with similar top cover grooves of other cell cases of a group for reception within several of the aligned grooves of a hold-down clamp flange of a length extending across the group of cases.

Other objects and advantages will become apparent from the following specification and the accompanying drawings wherein FIG. 1 is a perspective view showing a group of individual and replaceable battery cells interfitted in one arrangement; FIG. 2 is a small scale elevation of all four sides of a battery case in developed succession; FIG. 3 is a fragmentary view in vertical cross section showing on a larger scale a clamp hold-down at one upper corner; FIGS. 4 and 5 are perspective views illustrating alternate cell combining devices; FIG. 6 is a fragmentary vertical sectional view showing interfitted cell case walls and an alternative means for combining the cases against spreading apart; and FIG. 7 is a top plan diagram illustrating an arrangement of cell cases other than one in which the long side walls of the cases are side by side.

Referring to FIG. 1, a number of preassembled cell case units are shown in side by side succession with intervening air circulating space between the adjacent vertical walls of adjoining units. Each unit includes a rectangular box having four vertical walls two of which are oppositely disposed relatively narrow end walls 1 and the remaining two are oppositely disposed side walls 2 of a width double that of the end walls 1 and the several vertical walls are joined along their lower edges and are integral with a bottom wall. Each box unit also includes a separately formed top or cover wall 3 which is secured in place after the usual cell plates are inserted in the box and from which connector terminal posts project upwardly through the cover plate 3. Additionally, the cover plate 3 is provided with detachable plugs or closures 4 at fill and inspection openings. Each case unit may house a single set of plates or it can be partitioned interiorly for a multicell assembly. The battery cells can be electrically joined either in series or parallel relation by placing the cell units so that their respective positive and negative terminal posts are closely adjacent to selectively like or unlike terminal posts of neighboring boxes and joining the posts by means of the usual clamp connector straps, as shown at 5.

For spacing and locating any side wall of one cell unit with any side wall of a next adjoining cell unit, each of the vertical box walls is provided with laterally projecting male and female formations arranged as complements of one another and at like vertical locations. Such wall formations are specially designed to minimize the imposition of breaking stress on the side walls when mating formations are in horizontal and vertical seating abutment and furthermore the formations are shaped and arranged in a pattern for facilitating manufacture in separable molds of the cell boxes of plastic resin material and with the several walls and the side wall interlocking formations all integral as a one-piece unit. With the foregoing in mind, the interlocking formations to provide male and female parts are constituted on each vertical wall by a series of horizontally extending embossments or ribs arranged in a pattern or set of three, of which two of the ribs are vertically spaced apart, one above the other, and the remaining one of which ribs is vertically and horizontally offset from the pair of ribs and is of a vertical width substantially corresponding to the spacing between the pair of superposed ribs. As best seen in FIG. 1, the superposed pair of ribs 6 and 7 and the remaining rib 8 have adjacent ends adjacent one another and in a common vertical plane normal to the outer face of the vertical wall and providing vertical abutment and locating end faces. The space between the pair of superposed ribs 6 and 7 is bounded vertically by the top face of the lower rib 6 and the bottom face of the upper rib 7 to provide a receiving socket for a complemental rib 8 of any wall of another box having the same pattern of complemental ribs. In other words, the horizontal top and bottom faces of the rib 8 on any wall will fit the top and bottom faces of the pair of superposed ribs 6 and 7 of any other set of ribs in another wall. Such interfitment will be effected by horizontally aligning a pair of walls and moving the walls relative to one another in a direction normal to the plane of the box walls, whereupon the rib 8 of one wall is received within its reciprocal socket between the ribs 6 and 7 of the adjoining wall and similarly the corresponding rib 8 of the adjoining wall will be received between a pair of ribs 6 and 7. The interfitted horizontally extending rib faces of both sets of ribs will then locate the boxes against vertical displacement and the end abutment faces of the ribs of one set will be seated against similar vertical abutment faces of the other set of ribs and locate the boxes or cell cases against horizontal displacement.

A battery cell case usually is longer than it is wide and for enabling a longer side wall 2 of one battery cell case to be grouped in face to face abutment with an end wall 1 of another case, as seen in FIG. 7, or with end walls of a pair of side by side cases, then conveniently each end wall will be half as wide in the horizontal direction as the horizontal length of a side wall. In addition, each end wall will be faced with one set of interlocking ribs 6, 7 and 8 and each side wall will carry two such sets of ribs, one set in each half of the side wall length. For case molding purposes, the female die cavity should comprise two halves arranged for relative travel toward and from one another in a plane normal to the side walls 2 and with a die parting line at the vertical plane of the end abutment faces of the ribs on the end wall to accommodate separation of the halves following the molding of a case.

Each set of ribs 6, 7 and 8 is identical in pattern and vertical location on all vertical walls, as best seen in the developed view, FIG. 2. The sets of locating embossments on the several walls are presented successively in a horizontal row. One or more such rows are contemplated and when they are a pair, they preferably are vertically spaced apart near the top and bottom of the vertical cell walls. Such arrangement better insures uniform spacing between adjoining cells and minimizes localization of stresses. In addition to the terminal post interconnections shown at 5, the cell cases of a set may be tied against horizontal separation by means of a suitable binder strap such as shown at 9. This strap throughout its length has a succession of apertures 10 shaped for reception of the horizontally aligned set of projections on adjacent exterior walls of a group of cells. When so fitted to the row of sets of projections, the margins of the openings 10 will bear against and key themselves with the wall projections to resist displacement and additionally the opposite ends of the strap are preferably formed with inturned ears or flanges 11 to overlap with a snug frictional fit with the endmost walls of the battery assembly. Preferably, the fit of the end flanges 11 with the walls will be such as to place the strap 9 under a tension force for maintaining the strap against displacement. A single such strap may be used or straps can be used along both sides of the assembly.

As can be seen in FIGS. 1 and 3, each separately formed cover plate 3 extends laterally in overhanging and outrigger relation beyond the outer faces of all four cell walls. The extent of such overhang is controlled so as to be of a dimension half as much as the lateral dimension of the spacing and keying of the ribs 6, 7 and 8 so that when the outer vertical faces of the ribs are in bearing contact with the wall of an adjacent cell case the vertical edge surfaces of adjoining cover plates 3 will be in abutment and will supplement the spaced distance between adjoining cell walls. Spaced inwardly a like distance from each marginal edge is a dependent rib 12 on the underside of the cover 3 for stiffening and strengthening the marginal portion of the cover plate. These dependent ribs 12 have outwardly disposed vertical faces to afford locating shoulders for fitment to the internal surfaces of the side walls adjacent their open ends. A snug fit of these bearing faces in the cell side walls and cover aids in the maintenance of a tight seal and in the uniform distribution of stress transmitted between the walls. In the upper face of each cover plate 3 and in vertical alignment with the stiffening rib 12, a molded or formed seating depression or groove 13 extends inwardly from and in parallel relation with the vertical side edge of the cover. A groove 13 adjoins each marginal edge of the cover and extends in a straight line entirely across the width or length of the cover, as the case may be. In any combination of a series of cell cases, there will be a set of grooves aligned with one another in the covers of adjoining cell cases. The grooves are for reception and location of hold-down straps by which the battery assembly is to be secured in an operative mounted position. An improved type of hold-down strap can be formed of extruded metal or plastic material to present a horizontal main body 14 having a succession of openings near one side for receiving a clamp bolt 15 and having inwardly of the bolt openings a pair of spaced dependent flanges 16 and 17. These dependent flanges are spaced apart so that the innermost dependent flange 17 can be seated within the depression 13 while the outermost dependent flange 16 bears inwardly against the outer marginal portion or rim of the cover 3. Preferably, the strap 14 is of a length substantially the same as the length of the side walls 2 of the battery case or double the length of the end walls 1. Depending on the type of mounting installation, one or more of the clamping straps can be employed to engage with cell covers near any selected side walls. When a clamping strap is fitted to covers adjacent the end walls of a succession of batteries, its locating flange 17 can be fitted within the grooves 13 of two or more of the cell covers and in the case of a group of three battery cells arranged side by side, as in FIG. 1, the clamp desirably will span the centermost cell and be engaged at opposite ends with each of the covers of the endmost cases. The resulting clamp attachment will supplement and in some cases may eliminate the need for a binding strap such as that shown at 9.

Alternate forms of assembly binders are shown in FIGS. 4 and 5. In FIG. 4, a spring wire 18 is illustrated to straddle the group of battery cells with inturned legs 19 at opposite ends, each terminating in a vertical finger or hook 20. The resulting U-shaped wire can be rested downwardly on the uppermost keying rib 7 of the several sets and the terminal portions 20 can be hooked behind end faces of the ribs in the side walls at opposite ends of the cell succession. In FIG. 5, a flexible strap is illustrated as surrounding or embracing a succession of cells with opposite ends brought together and suitably anchored. For anchoring purposes, each end portion is provided with a succession of apertures 21 for selective fitment to one or more pins 22 projecting outwardly from an anchor plate 23. The opposite ends of the flexible strap are brought in succession into overlapping relation with the plate 23 and have their openings 21 fitted selectively to the attachment pins 21 for placing the binding strap under proper tension for retaining the succession of cells against horizontal separation.

An arrangement for maintaining the cells against separation without the use of separate binding members and which will be feasible for certain types of installations, makes use of magnetism. For such purposes, a permanent bar magnet and a bar of magnetic material are mounted as a set in each vertical wall and in a like pattern and location in each wall. Conveniently and as seen in FIG. 6, a permanent bar magnet 24 can be embedded within the wall of the case immediately under an adjacent outwardly projecting rib 8 and a bar of magnetic material 25 is similarly embedded in the case wall behind the pair of superposed ribs 6 and 7. When the ribs are interfitted as seen in FIG. 6, the bar 25 will be within the field between the north and south poles of the bar magnet 24 and the force of the magnet will resist separation of the interlocked cell walls. The disposition and pattern of the magnets 24 and bars 25 of magnetic material can be varied from that illustrated so long as a mating relationship is obtained when cell cases are in a selected line of succession. There is also contemplated the positioning of magnets and armature bars whose faces are exposed in the exterior surface of battery cell cases, with the magnets of sufficient strength to preclude separation of adjoining walls under ordinary misplacement as to constitute the sole means for holding cell cases in final assembly.

Notwithstanding the fact that the foregoing description has detailed the structure and arrangement of a preferred embodiment of the invention, it is to be understood that this is not by way of limitation except as defined in the attached claims.

What is claimed is:

1. A storage battery assembly comprising a number of individually preformed cell boxes adapted for interconnected grouping in any selected combination of adjoining boxes, each box having four vertical walls in rectangular relation, like sets of three narrow elongate external bosses carried by and projected laterally from said walls, two bosses of each set being paired in superposed vertically spaced apart relation and being provided with flat bearing faces at the bottom of the uppermost of the two bosses and at the top of the lowermost of the two bosses and the remaining one boss being positioned in end to end succession with and vertically offset from said two bosses and in horizontal alignment with and of a vertical width corresponding to the vertical space between said flat bearing faces and said one boss having flat top and bottom bearing faces to mate with the upper and lower flat bearing faces of a like set of bosses on another cell box, all of such sets of bosses being of similar pattern and in complemental location as viewed in elevation on the vertical walls for internested fitment of the formations on any wall with mating formations of a wall of another box by relative movement of a pair of boxes toward one another in a direction at right angles to the vertical walls.

2. In an electric storage battery cell combination, a number of individually preformed cell boxes adapted for interconnected grouping in any selected combination of adjoining boxes, each box having four vertical walls in rectangular relation, like sets of three narrow elongate external bosses carried by and projected laterally from said walls, two bosses of each set being paired in superposed vertically spaced apart relation and being provided with flat bearing faces at the bottom of the uppermost of the two bosses and at the top of the lowermost of the two bosses and the remaining one boss being positioned in end to end succession with and vertically offset from said two bosses and in horizontal alignment with and of a vertical width corresponding to the vertical space between said flat bearing faces and said one boss having flat top and bottom bearing faces to mate with the upper and lower flat bearing faces of a like set of bosses on another cell box, all of such sets of bosses being of similar pattern and in complemental location as viewed in elevation on the vertical walls for internested fitment of the formations on any wall with mating formations of a wall of another box by relative movement of a pair of boxes toward one another in a direction at right angles to the vertical walls, the internesting of the formations of adjacent boxes holding the boxes against separation in directions parallel with the vertical walls and retaining means engageable with the boxes to hold them against separation at right angles to said walls.

3. A storage battery assembly comprising a number of individually preformed cell boxes adapted for interconnected grouping in any selected combination of adjoining boxes, each box having four vertical walls in rectangular relation, a set of external bosses carried by and projected laterally at each wall and shaped to provide spaced apart male and female formations having load bearing surfaces extended laterally at substantially ninety degrees from the vertical plane containing such wall and being of similar pattern and in complemental location as viewed in elevation on the vertical walls for internested fitment of the formations on any wall with mating formations of a wall of another box by relative movement of a pair of boxes toward one another in a direction at right angles to the vertical walls, a top cover for each cell box having depressions in the marginal portions of the top surface thereof and each depression extending on a straight line across the top surface and a hold-down strap adapted to overlie selectively any marginal portion of the top and provided with a dependent locating flange fitted to the depression adjacent the selected marginal portion.

4. In an electric storage battery cell combination, a number of cell boxes adapted to be grouped with any vertical wall of any box in juxtaposed relation with any vertical wall of an adjacent box, means joining such boxes against separation, a top cover for each box having adjacent each edge a straight line depression in the upper surface of the cover and extended entirely across the upper surface and all depressions being spaced inwardly a like distance from the edge adjacent each thereof and being adapted selectively for co-operation of a hold-down strap and a hold-down strap having a dependent flange seated in the depressions of the covers of the boxes and also having a clamp receiving flange projected outwardly from the dependent seating flange.

5. A storage battery cell combination as in claim 4 wherein said hold-down strap is longer than the length of a cover depression in a medial box of a group of side by side positioned boxes so as to span the medial box and seat within the aligned depressions of the medial box and boxes on both sides thereof.

6. In a storage battery cell combination, a number of cell boxes adapted for connection as a group and with their adjoining vertical walls interlocked, sets of interlocking formations carried by the vertical walls and comprised in each set of a pair of vertically spaced apart raised ribs providing a pocket therebetween and a raised rib in end to end horizontal succession with said pair of ribs and in horizontal alignment and of a vertical width substantially corresponding with the vertical space distance between said pair of ribs and providing a key to nest within a like pocket carried by a similar cell box, the adjacent ends of said ribs of each set constituting vertical abutment faces for horizontal locating contact with similar adjacent rib end abutment faces of such similar cell box.

7. In a storage battery cell combination, a number of cell boxes for connection as a group with adjoining vertical walls interlocked, each cell wall having a raised key integral therewith and also having a socket for reception of a key on an adjacent wall of an adjoining box upon relative horizontal movement of the boxes toward one another, a set of bars comprising a permanent magnet and an armature carried by each said wall in a like pattern of spaced bars in all the walls, and the armatures of adjacent walls of adjoining cell boxes being each in the field of a magnet of the adjoining wall.

8. In a molded battery cell case having vertical walls for fitment to similar walls of other like cell cases, a set of horizontal elongate spacer ribs integral with and projected from each of said vertical walls and arranged in the same formation pattern on each wall, each set comprising a first rib having elongate flat top and bottom surfaces lying in substantially parallel horizontal planes vertically spaced apart and a second rib and a third rib in proximate end to end succession with the first rib and offset vertically and horizontally from the first rib and with their adjacent horizontal surfaces in parallel horizontal planes vertically spaced apart in substantial conformation to the vertical spacing of said top and bottom surfaces of the first rib, the adjacent end faces of all the ribs occupying a common vertical plane and affording locating bearings for complemental end faces of the ribs in a like set on the wall of another cell case.

9. In a battery cell case as in claim 8, a permanent bar magnet and an armature bar embedded within each wall and in like spaced apart locations on all walls, each armature bar being positionable in the field of a bar magnet in an adjoining wall of another like cell case for resisting separation of interfitted ribs of such adjoining wall.

10. In an electric storage battery combination, a number of cell cases for connection in succession, locating means carried by opposed walls of adjoining cell cases and comprised of separate devices one on one wall and the other on the other wall and which devices are holding complements of one another and are capable of being brought into locating relationship one with another by moving the box wall having one such device toward a box wall having the complemental device and in a direction normal to the box walls, said complemental devices comprising in one instance a permanent magnet and in the other case an element of magnetic material to be attracted toward the magnet by the field thereof.

11. In an electric storage battery cell combination, a number of cell cases for connection in succession, a set of outwardly projecting separate ribs carried by the vertical walls of each cell case and arranged in a like pattern to form a key and a key reeciving socket extended horizontally from each wall and located so that the keys and sockets of adjoining walls interfit and a cell case binder strip fitted against and spanning aligned walls of a succession of cell cases and having end portions in bearing engagement with the endmost walls of the succession of cell cases to resist their separation in the horizontal direction, said strip being a flat strap and having openings along its length in keyed fitment around the sets of ribs carried by said aligned walls and thereby locating the binder strip against vertical separation from the cell cases.

References Cited in the file of this patent

UNITED STATES PATENTS

| | | |
|---|---|---|
| 672,219 | Stevens | Apr. 16, 1901 |
| 1,021,900 | Smith | Apr. 2, 1912 |
| 1,152,246 | Walker | Aug. 31, 1915 |
| 1,305,084 | Flanders | May 27, 1919 |
| 2,980,752 | Tore et al. | Apr. 18, 1961 |
| 2,994,395 | Hall | Aug. 1, 1961 |

FOREIGN PATENTS

| | | |
|---|---|---|
| 743,215 | Great Britain | Jan. 11, 1956 |